C. H. LOEW.
FILTER PRODUCING APPARATUS.
APPLICATION FILED OCT. 7, 1908.
959,021.
Patented May 24, 1910.
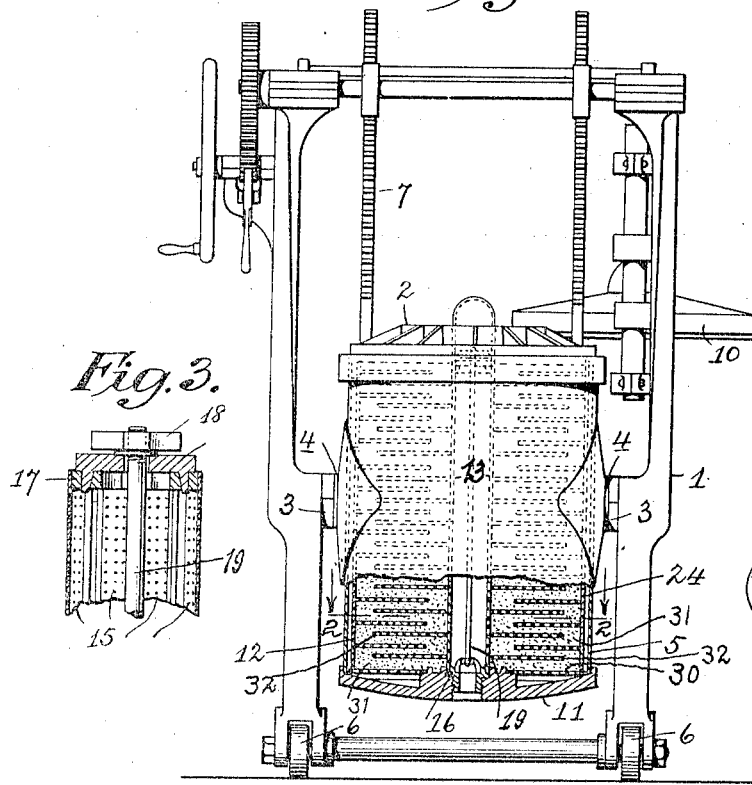
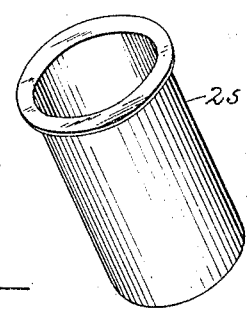
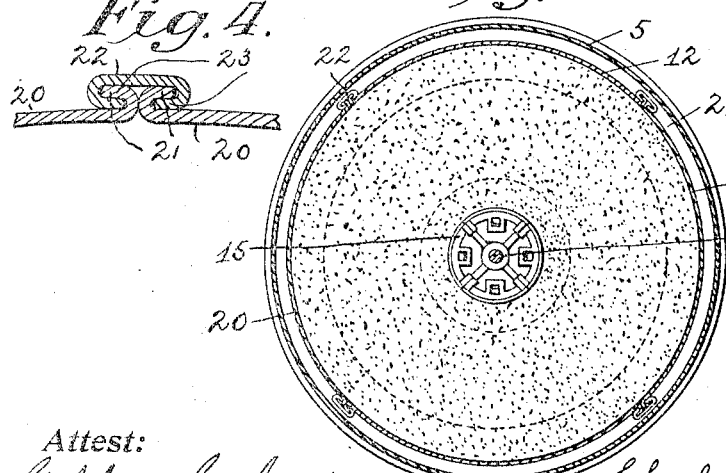
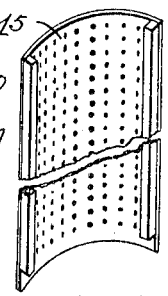
Attest:
Stephen S. Newton
Alan C. McDonnell
Inventor:
Charles H. Loew
by William R. Baird
his Atty.

UNITED STATES PATENT OFFICE.

CHARLES H. LOEW, OF LAKEWOOD, OHIO.

FILTER-PRODUCING APPARATUS.

959,021. Specification of Letters Patent. Patented May 24, 1910.

Application filed October 7, 1908. Serial No. 456,608.

*To all whom it may concern:*

Be it known that I, CHARLES H. LOEW, a citizen of the United States, and resident of Lakewood, Cuyahoga county, Ohio, have invented certain new and useful Improvements in Filter-Producing Apparatus, of which the following is a specification.

My invention relates to means for producing filters and particularly to those employed in the clarification of beer, and its novelty consists in the construction and adaptation of the parts of the filter and the several successive steps of the process employed in packing, using and unpacking it.

One of the difficulties which has heretofore existed in using a filter of the class has been that of removing the filter mass after use. The filter, in order to be efficient, must be tightly packed and when tightly packed it is correspondingly difficult to unpack. If the filter elements are separately formed outside of the filter and then placed within it, they are removed more readily than when the filter mass is packed *in situ* as a whole, but they lack uniformity of structure and efficiency in operation. Another point to be observed is that the filter mass should, if possible, be packed more tightly at the center, where the beer is discharged than at the outside where it enters. I have accomplished this result for many years by increasing the quantity of wood pulp at the center, but that practice is not so simple as the one about to be described. I have discovered a simple and efficient way of packing the filter so that its filter elements at the center will be packed very tightly and I have also discovered a simple way of quickly unpacking the filter. In brief, I make the inner perforated tube removable and collapsible. I make the outer drum in which the filter elements are packed practically imperforate and I remove it entirely by simple means before the filtering operation is begun and I provide a false or temporary removing drum adapted to incase the filter elements after use and by means of which they are promptly removed as a whole.

In the drawings, Figure 1 is a central vertical section of a filter showing the inner tube and packing drum in place; Fig. 2 is a transverse section on the plane of the line 2—2 in Fig. 1; Fig. 3 is an enlarged detail of the top of the inner tube; Fig. 4 is an enlarged sectional detail of the packing drum binding sleeve, Fig. 5 is a miniature perspective of the removing drum. Fig. 6 is a detail perspective view of one of the inner tube sections.

In the drawings, 1 is the frame of a filter provided with wheels or casters 6, having at a convenient place inwardly extending bearings 3 on which there are adapted to rest and swing the trunnions 4 of a filter casing 5 made of any suitable size and material. The frame is also provided with a press comprising a flat plate 2 adapted snugly to fit within the filter casing to press the filter mass closely together and with suitable means indicated at 7 whereby the press may be raised and lowered. The filter casing is provided with a bottom 11 having suitable inlet and outlet ports and it will be understood that the filter elements are arranged within the casing which is provided with a suitable air tight cover 10. All of these parts have been described in previous patents of the United States issued to me and form no part of the invention.

The inner tube 13, as stated, is made of perforated material and consists of a plurality of vertical segments 15 provided with a lower base or support 16 into which they fit, an upper clamping ring 17 which engages their upper edges and a wing nut 18, or a similar device, by which they may be secured firmly together through a central clamping rod 19. The packing drum 12 is also made of a plurality of vertical segments 20 which rest upon the bottom 11. Each segment has a reverted vertical flange 21 and the adjacent flanges of neighboring segments are secured together by vertical metal sleeves 22 having inturned flanges 23 adapted to slide between the segments 20 and their flanges 21 forming a perfectly tight joint against lateral strains and yet capable of immediate and ready vertical displacement. An annular space 24 is left between the packing drum and the casing.

A removing drum 25 is adapted to fit between the casing and the packed filter mass.

In use the filter is packed in the usual manner, a woven wire or similar plate 30 centrally apertured to pass over the inner tube and constituting the lowermost inlet conduit is put at the bottom of the space between the inner tube 13 and drum 12. The filter mass 31 is then put in position, then an outlet conductor 32, then more filter mass, then an inlet conductor, then more filter mass and so on until the filter is full. As every second or third layer is inserted the press is lowered and operated to compress the mass tightly.

I have discovered what heretofore has remained unsuspected, that if the inner tube is perforated and the outer drum is substantially not perforated, the filter mass will be packed more tightly against and around the perforated surfaces than the imperforate or less highly perforated surfaces. I say "less highly perforated" because I find that any substantial difference in the foraminous character of the walls will produce the relative more tightly packed filter mass near the more highly perforated surface and some few perforations are desirable in the outer drum for initial or surface drainage.

As the press descends against the mass of wood pulp which is mixed with water the latter is expelled and seeking the easiest exit passes through that one of the retaining surfaces more highly perforated. The continued pressure of the press naturally therefore packs the filter mass tighter around and adjacent to such surface. If the outer drum was highly perforated and the inner drum was less highly perforated the filter mass would be more tightly packed against the drum. After the filter mass is tightly packed, the sleeves 22 are pulled out and the drum segments 20 removed. The beer is then turned on first entering the annular space 24 between the casing and the packed filter mass then passing through the filter mass and into the inner tube. After the filtering operation is concluded and it is desired to remove the filtering elements, the cover is removed. The removing drum 25 is inserted in the annular space 24 surrounding the filter mass and inside of the casing. The wing nuts and clamping ring of the inner tube are then removed. A hook is then attached to one of the segments 20 and to the filter press and when the latter is moved upward the segment comes with it. The remainder of the inner tube is then removed. The filter is then tilted so that its former vertical axis becomes horizontal and removing the drum the entire filter mass within it is pulled out.

What I claim as new is:—

1. The combination with perforated spaced outer and inner filter forming walls, one being more highly perforated than the other, of means for pressing filtering material between the walls.

2. A device of the character set forth provided with an annular receptacle adapted to receive pulp mixed with water in which it is compressed to form a filtering medium, the inner wall of the receptacle being highly perforated and the outer wall being less highly perforated whereby when compressed the pulp is packed more tightly near the inner wall than near the outer wall.

3. A device of the character set forth provided with an annular receptacle adapted to receive pulp mixed with water in which it is compressed to form a filtering medium, the inner wall of the receptacle being highly perforated and the outer wall being less highly perforated whereby when compressed the pulp is packed more tightly near the inner wall than near the outer wall, the outer wall of the receptacle being removable, and its inner wall being collapsible.

4. A device of the character set forth provided with an annular receptacle adapted to receive pulp mixed with water in which it is compressed to form a filtering medium, one wall of the receptacle being highly perforated and the other wall being less highly perforated, whereby when compressed the pulp is packed more tightly against the highly perforated wall than it is against the less highly perforated wall and its inner wall being collapsible.

5. A device of the character set forth provided with an inner perforated collapsible tube in combination with means for pressing wood pulp mixed with water against the same.

6. A device of the character set forth provided with an inner perforated collapsible tube made of vertical segments and means for coupling the same together at bottom and top.

7. A device of the character set forth provided with an inner perforated collapsible tube made of vertical segments and means for coupling the same together at bottom and top in combination with means for pressing wood pulp mixed with water against the same.

8. A device of the character set forth provided with an inner tube and an outer drum within which the filter mass is adapted to be pressed, the outer drum being composed of vertical segments in combination with means adapted to hold the segments together while the pulp is being pressed into place.

9. A device of the character set forth provided with an inner tube and an outer drum within which the filter mass is adapted to be pressed, the outer drum being composed of vertical segments in combination with means adapted to hold the segments together while the pulp is being pressed into place, consisting of a reverted flange on each sleeve and means adapted to engage both flanges of adjacent segments.

10. A device of the character set forth provided with an inner tube and an outer drum within which the filter mass is adapted to be pressed, the outer drum being composed of vertical segments in combination with means adapted to hold the segments together while the pulp is being pressed into place, consisting of an inverted flange on each sleeve and a slippable sleeve adapted to engage both flanges of adjacent segments.

11. A filter casing in combination with an inner removable drum consisting of separable segments and vertically arranged couplings adapted to hold them temporarily together.

12. A filter casing in combination with an inner removable drum consisting of separable segments and vertically arranged couplings adapted to hold them temporarily together and a smaller cylinder or drum made of collapsible segments.

13. A filter casing in combination with an inner removable drum consisting of separable segments and vertically arranged couplings adapted to hold them temporarily together and a smaller inner collapsible cylinder or drum made of perforated segments.

14. A filter casing in combination with an inner removable drum consisting of separable segments and vertically arranged couplings adapted to hold them temporarily together and a smaller inner collapsible cylinder or drum made of perforated segments and held together by removable means.

15. A filter casing in combination with an inner removable drum consisting of separable segments and vertically arranged couplings for holding the segments temporarily together, said drum and casing being spaced apart to receive a removing drum.

16. The combination with a filter casing of filter elements assembled therein whereby an annular space is left between such assembled elements and the casing, and a collapsible drum surrounded by said elements when assembled.

Witness my hand this 5th day of October, 1908, at Lakewood, Ohio.

CHARLES H. LOEW.

Witnesses:
T. W. SPRINGMEYER,
ALAN C. McDONNELL.